United States Patent
Maeda et al.

(10) Patent No.: US 6,479,193 B1
(45) Date of Patent: Nov. 12, 2002

(54) OPTICAL RECORDING FILM AND PROCESS FOR PRODUCTION THEREOF

(75) Inventors: Koichi Maeda, Yokkaichi (JP); Hiroaki Yamamoto, Itami (JP); Akio Takigawa, Itami (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 08/412,021

(22) Filed: Mar. 28, 1995

Related U.S. Application Data

(62) Division of application No. 08/279,627, filed on Jul. 25, 1994, now abandoned, which is a continuation of application No. 08/086,241, filed on Jun. 30, 1993, now abandoned.

(30) Foreign Application Priority Data

| Jun. 30, 1992 | (JP) | 4-172534 |
| Nov. 10, 1992 | (JP) | 4-299040 |

(51) Int. Cl.$^7$ ................................ G03H 1/02
(52) U.S. Cl. ............... 430/1; 430/2; 430/290; 430/270.1; 430/281.1; 359/3
(58) Field of Search ................ 430/1, 2, 290, 430/270, 300, 302, 281, 330, 270.1, 281.1; 359/1, 3

(56) References Cited

U.S. PATENT DOCUMENTS

| 3,658,526 A | * | 4/1972 | Haugh ........................... 430/1 |
| 3,850,770 A | * | 11/1974 | Juna et al. ...................... 430/915 |
| 3,884,693 A | * | 5/1975 | Bauer et al. ................... 430/263 |
| 4,042,476 A | * | 8/1977 | Collins et al. ................. 522/14 |
| 4,173,474 A | * | 11/1979 | Tanaka et al. .................. 430/1 |
| 4,187,111 A | * | 2/1980 | Chandross et al. ............. 430/1 |
| 4,210,081 A | * | 7/1980 | Croker ......................... 430/302 |
| 4,535,041 A | * | 8/1985 | Fielding et al. ................ 430/1 |
| 4,588,664 A | * | 5/1986 | Fielding et al. ................ 430/1 |
| 4,613,560 A | * | 9/1986 | Dueber et al. ................. 430/198 |
| 4,808,500 A | * | 2/1989 | Wreede et al. ................. 430/1 |
| 4,942,102 A | * | 7/1990 | Keys et al. .................... 430/1 |
| 4,942,112 A | * | 7/1990 | Monroe et al. ................. 430/1 |
| 4,963,471 A | * | 10/1990 | Trout et al. .................... 430/1 |
| 4,970,129 A | * | 11/1990 | Ingwall et al. ................. 430/1 |
| 5,154,994 A | * | 10/1992 | Yamagishi et al. ............ 430/2 |
| 5,196,282 A | * | 3/1993 | Knobbe ......................... 430/1 |
| 5,198,912 A | * | 3/1993 | Ingwall et al. ................. 430/1 |

FOREIGN PATENT DOCUMENTS

| JP | 57-62046 | * | 4/1982 |
| JP | 57 62046 | * | 4/1982 |

OTHER PUBLICATIONS

The Merck Index (1983) p. 1220.*
Caulfield et al; "The Applications of Holography" (1970) pp 44–49.*
Gladden; Review of photosensitive materials for Holographic recordings (1978) pp 54–56.*
Hackh's Chemical Dictionary (1969) p. 347.*

* cited by examiner

Primary Examiner—Martin J Angebranndt
(74) Attorney, Agent, or Firm—Wenderoth, Lind & Ponack, L.L.P.

(57) ABSTRACT

There are disclosed the following three types of optical recording film:

(1) an optical recording film comprising a gel having a network structure of an inorganic substance and a polymer which is from a photopolymerizable compound (A) and present in the network structure in the gel, said gel containing an optical recording-induced difference in the network structure.

(2) an optical recording film, which consists essentially of a porous gel having a network structure of an inorganic substance, the porous gel containing recording-induced porosity differences in the network structure.

(3) an optical recording film which consists essentially of a porous gel having a network structure of an inorganic substance or a gel obtained by densification of the porous gel, the porous gel or the gel having a recording-induced concavo-convex form on the surface thereof.

11 Claims, 1 Drawing Sheet

OPTICAL RECORDING FILM AND PROCESS FOR PRODUCTION THEREOF

This is a division of U.S. Ser. No. 08/279,627 filed Jul. 25, 1994 (now abandoned), which was a continuation of U.S. Ser. No. 08/086,241 filed Jun. 30, 1993 (also now abandoned).

BACKGROUND OF THE INVENTION

1. Field of the Invention

The present invention relates to an optical recording film and a process for the production thereof, and further to a film for optical recording, a process for the production thereof and a composition useful for the production of the film for optical recording.

2. Prior Art

Holograms are known which are classified into amplitude and phase types (refractive index modulation types) in respect of their recording principles, into surface and volume types in respect of their structures, and into transmission (opposing direction) and reflection (same direction) types in respect of directions of illuminating light and diffracted light in reconstruction. Among these, a volume phase type is excellent particularly in optical characteristics such as diffraction efficiency. It has been already demonstrated that the maximum diffraction efficiency of the volume phase type including the transmission type and the reflection type can be theoretically 100 percent. It is therefore considered that the volume phase type hologram can be applied not only as a display hologram for recording images but also as a variety of optical devices utilizing high diffraction efficiency, such as a grating device, an optical division device, an optical coupling device and a laser beam scanning device.

The volume phase hologram of a reflection type in particular has intense interference activity and remarkable wavelength selectivity and can hence permit reconstruction in white light. Therefore, the volume phase hologram of a reflection type due to this feature and brightness of its reconstructed image is attracting wide attention. Further, due to its high wavelength selectivity, it is put to practical use in some areas such as head-up displays for an aircraft, an automobile and a vehicle and laser protection ophthalmic glasses.

The material for the volume phase type hologram has been selected from photosensitive materials for photograph typified by a silver halide emulsion and dichromated gelatin (DCG). The silver halide emulsion and DCG have so far been widely used since the former has high sensitivity and the latter has excellent optical properties such as high diffraction efficiency.

Since, however, DCG is poor in storage stability, it is always required to prepare DCG before exposure. Further, it requires complicated wet processing such as development and fixing after holographic exposure, and it also has a problem in that a hologram produced therefrom is still insufficient in light resistance and humidity resistance. These problems hinder commercial production of a hologram from DCG.

Silver halide emulsion has sufficient performance as a holographic material as far as its sensitivity is concerned. However, the problem thereof is that it exhibits no high resolution due to its particulate properties, that is, it is not properly used for recording interference fringes having a high spatial frequency, and that the transmittance decreases. Further, there is another problem in that it is poor in light resistance when bleached for producing a phase type hologram. Moreover, it also requires important and essential but complicated wet processing such as development and fixing after holographic exposure as DCG does.

For overcoming the above problems of conventional materials for the volume phase hologram, the development of a photopolymer is under way in recent years. A photopolymer is excellent in storage stability and is essentially free of a resolution problem since it has no particulate properties. Further, it is said that it is possible to improve light resistance and humidity resistance by selecting its composition, and the problem in reconstruction of recorded data is being solved.

The photopolymer is classified into a photo-crosslinkable polymer and a photopolymerizable polymer. The photo-crosslinkable polymer includes a polymer whose molecule has a photocrosslinking functional group as disclosed in Japanese Laid-open Patent Publications Nos. 114029/1983 and 211181/1983. When this polymer is used, the photo-crosslinking proceeds according to light intensity distribution of interference fringes, and interference fringes are recorded as a crosslinkage distribution. In this method, therefore, development as a post step is required for obtaining high diffraction efficiency.

Concerning the photopolymerizable polymer, there is a method using a combination of a so-called photopolymerizable monomer and a binder polymer as is disclosed in U.S. Pat. Nos. 4,173,474, 4,535,041, 4,942,112 and 4,963,471 and EP 324,482. In this method, the photopolymerizable monomer is contained in an optical data-recording material, and the polymerization of the photopolymerizable monomer selectively proceeds according to light intensity distribution formed by holographic exposure, thereby to record the interference fringes. In particular, U.S. Pat. No. 4,963,471 uses a fluorine-containing polymer having a low refractive index as a binder in combination with a monomer having a high refractive index for obtaining high diffraction efficiency in a reflection type phase hologram.

On the other hand, for using volume phase holograms of either a transmission type or a reflection type in a wider fields, it is desired to impart not only excellent optical characteristics and easiness in a post step such as freedom of wet processing, but also high heat resistance and environment resistance. For achieving this object, it is expected to develop a novel material for recording a hologram, which is basically different from any prior materials.

SUMMARY OF THE INVENTION

It is an object of the present invention to provide an optical recording film which can be a hologram excellent in diffraction efficiency, resolution and transmittance.

It is another object of the present invention to provide an optical recording film excellent in heat resistance and environment resistance.

It is another object of the present invention to provide a process for the production of an optical recording film having the above excellent physical properties.

It is another object of the present invention to provide a film for optical recording to be used in the above production process, and a process for the production thereof.

It is further another object of the present invention to provide a composition useful for producing the above film for optical recording.

According to the present invention, there is provided an optical recording film (hereinafter referred to as the first optical recording film) comprising a gel having a network structure of an inorganic substance and a polymer which is from a photopolymerizable compound (A) and present in the network structure in the gel, said gel containing an optical recording-induced difference in the network structure of the gel.

Further, there is provided a film for optical recording, which comprises a gel having a network structure of an inorganic substance, a photo-polymerizable compound (A) and a photoinitiator (B), the photopolymerizable compound (A) and the photoinitiator (B) being contained in the network structure.

Further, there is provided a process for the production of an optical recording film, which comprises recording optical data by exposing the above film for optical recording to actinic radiation.

Further, there is provided a composition containing a photopolymerizable compound (A), a photoinitiator (B), a metal compound (C) which is crosslinkable by self-hydrolysis when in contact with water and the subsequent polycondensation, a good solvent (D) for the above metal compound, water (E) and a catalyst (F) for the hydrolysis of the above metal compound.

Further, there is provided a process for the production of a film for optical recording, which comprises applying the above composition to a substrate and drying the composition to form a solid-like film containing a gel having a network structure of an inorganic substance, a photopolymerizable compound (A) and a photoinitiator (B), the photopolymerizable compound (A) and the photoinitiator (B) being contained in the network structure of the gel.

Further, there is provided an optical recording film (hereinafter referred to as the second optical recording film) consisting essentially of a porous gel having a network structure of an inorganic substance, said porous gel containing optical recording-induced porosity differences in the network structure.

Further, there is provided an optical recording film (hereinafter referred to as the third optical recording film) consisting essentially of a porous gel having a network structure of an inorganic substance or a gel obtained by densification of the porous gel, the porous gel or the densified gel having a optical recording-induced concavo-convex form on the surface thereof.

Further, there is provided a process for the production of an optical recording film, which comprises applying the above composition to a substrate to form a coating, drying the coating to form a film for optical recording, irradiating the film with actinic radiation to record optical data, and removing the organic component contained in the film.

The above objects are achieved by these inventions.

DETAILED DESCRIPTION OF THE INVENTION

Figure 1:
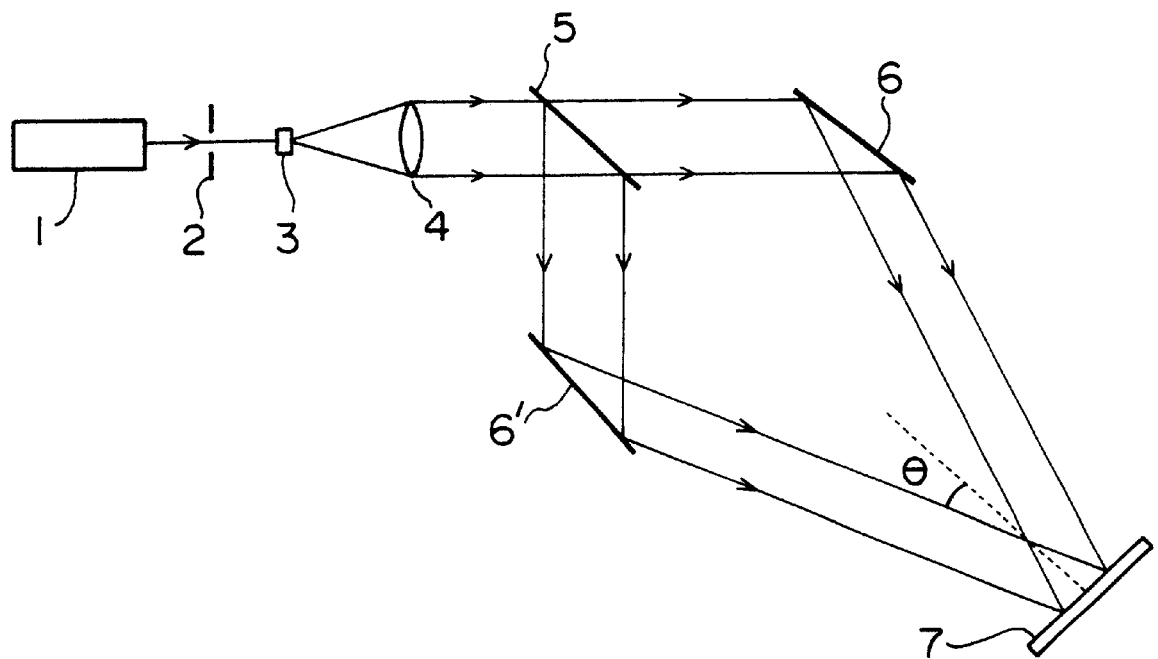
FIG. 1 is a schematic view showing an optical system used for recording a transmission type hologram (diffraction grating) in a film for optical recording, provided by the present invention, in Examples.

The first optical recording film provided by the present invention comprises a gel having a network structure of an inorganic substance and a polymer of a photopolymerizable compound (A) present in the network structure in the gel.

The inorganic substance includes metal oxides such as silicon oxide, titanium oxide, zirconium oxide and aluminum oxide. Of these, silicon oxide and titanium oxide are preferred.

The gel having a network of the above inorganic substance may have a long chain bonded thereto, such as a polyalkylsiloxane chain, a polydialkyltitanoxane chain, a polydialkylzirconoxane chain or a polydialkylaluminoxane chain. The amount of the above chain based on the metal oxide is 50% by weight or less, preferably 30% by weight or less.

The photopolymerizable compound (A) can be selected from photopolymerizable monomers and oligomers containing at least one polymerizable group typified by an acryloyl group, a methacryloyl group, a vinyl group and an allyl group.

Specific examples of the photopolymerizable monomers include monofunctional acrylates such as tetrahydrofurfuryl acrylate, ethylcarbitol acrylate, dicylopentenyloxyethyl acrylate, phenylcarbitol acrylate, nonylphenoxyethyl acrylate, 2-hydroxy-3-phenoxypropyl acrylate, ω-hydroxyhexanoyloxyethyl acrylate, acryloyloxyethyl succinate, acryloyloxyethyl phthalate, phenyl acrylate, naphthyl acrylate, tribromophenyl acrylate, phenoxyethyl acrylate, tribromophenyoxyethyl acrylate, benzyl acrylate, p-bromobenzyl acrylate, 2,2-bis(4-methacryloxyethoxy-3,5-dibromophenyl)propane, isobornyl acrylate, 2-ethylhexyl acrylate, lauryl acrylate, 2,2,3,3-tetrafluoropropyl acrylate and acrylsilane and methacrylates corresponding to these monofunctional acrylates; polyfunctional acrylates such as 1,6-hexanediol diacrylate, butanediol diacrylate, ethylene oxide-modified tetrabromobisphenol A diacrylate, pentaerythritol triacrylate, trimethylolpropane triacrylate and bisphenol A diacrylate and methacrylates corresponding to these polyfunctional acrylates; vinyl compounds such as styrene, p-chlorostyrene, divinylbenzene, vinyl acetate, acrylonitrile, N-vinylpyrrolidone, vinylnaphthalene, N-vinylcarbazole and vinylsilane; and allyl compounds such as diethylene glycol bisallyl carbonate, triallyl isocyanurate, diallylidene pentaerythritol, diallyl phthalate and diallyl isophthalate.

Specific examples of the photopolymerizable oligomers include oligomers of the above photopolymerizable monomers, polyfunctional oligoacrylates such as urethane acrylate oligomer, epoxy acrylate oligomer, polyester acrylate oligomer, polyol polyacrylate, modified polyol polyacrylate and polyacrylate having an isocyanurate acid skeleton, and methacrylates corresponding to these acrylates.

The above urethane acrylate oligomer includes those formed by an addition reaction of polyisocynate, 2-hydroxyalkyl (meth)acrylate and polyol. The polyisocyanate includes toluene diisocyanate, isophorone diisocyanate, trimethylhexamethylene diisocyanate and hexamethylene diisocyanate. The polyol includes polyether polyols such as polyethylene glycol, polypropylene glycol and polytetramethylene glycol, polyester polyol, polycarbonate polyol and polysiloxane polyol.

The polymer of the photopolymerizable compound (A) may be a homopolymer or a copolymer.

The amount of the polymer per 100 parts by weight of the gel is preferably 30 to 1,000 parts by weight, more preferably 100 to 800 parts by weight.

In the first optical recording film of the present invention, the refractive index of the inorganic substance and the refractive index of the polymer from the photopolymerizable compound (A) differ from each other, and the difference between the refractive indices is preferably at least 0.01, more preferably at least 0.03. The maximum difference is about 1.0. For example, when the network of the inorganic substance is formed from $SiO_2$ having a low refractive index, it is preferred to use a polymer having a high refractive index in combination. When the network is formed from $TiO_2$ having a high refractive index, it is preferred to use a polymer having a low refractive index in combination. The preferred combination of the inorganic substance with the polymer is a combination of a 2-hydroxy-3-phenoxypropyl acrylate homopolymer (refractive index 1.555) with $SiO_2$ (refractive index 1.46) and a combination of a 2-hydroxypropyl acrylate homopolymer (refractive index 1.52) with $TiO_2$ (refractive index 2.40).

A network structure difference is present in the gel constituting the first optical recording film of the present invention, and optical recording is based on the difference. For example, the gel contains coarse network portions and dense network portions, and optical recording is based on this coarse-dense distribution. The presence of coarse and dense network portions in the gel corresponds to the presence of portions which have different refractive indices in the gel.

When the above optical recording film is a volume phase hologram, the coarse and dense network distribution is formed according to light intensity distribution of interference fringes of coherent light. The network is coarsely present in a portion where light intensity is high, and it is densely present in a portion where light intensity is low. Thus, the coarseness-denseness is correlative to variation of the refractive index to cause refractive index modulation.

Depending upon methods of recording optical data, the above optical recording film can be any one of a transmission type hologram and a reflection type hologram.

The above first optical recording film of the present invention can be obtained by exposing a film for optical recording to actinic radiation, the film comprising a gel having a network structure of an inorganic substance, a photopolymerizable compound (A) and a photoinitiator (B) and the photopolymerizable compound (A) and the photoinitiator (B) being contained in the network structure of the gel.

As the inorganic substance constituting the gel of the film for optical recording, those described regarding the above optical recording film including its preferred embodiments can be applied. And, the inorganic substance has a three-dimensional network structure, and forms a gel, in the film for optical recording.

The photopolymerizable compound (A) is as described before. Further, it is preferred to combine the inorganic substance and the photopolymerizable compound (A) such that the refractive index of the inorganic substance and the refractive index of a polymer from the photopolymerizable compound (A) differ from each other by at least 0.01, particularly by at least 0.03.

Specific examples of the photoinitiator (B) include cyclic cis-α-dicarbonyl compounds such as 2,3-bornanedione (camphorquinone), 2,2,5,5-tetramethyltetrahydro-3,4-furoic acid(imidazoletrione), benzophenones such as 3,3',4,4'-tetra-(t-butylperoxycarbonyl)benzophenone, ketones such as diacetyl, benzyl, Michler's ketone, diethoxyacetophenone, 2-hydroxy-2-methylpropiophenone and 1-hydroxycyclohexylphenylketone, peroxides such as benzoyl peroxide and di-tert-butyl peroxide, azo compounds such as allyldiazonium salt, aromatic carboxylic acids such as N-phenylglycine, xanthenes such as 2-chlorothioxanthone and 2,4-diethylthioxanthone, diallyliodonium salts, triallylsulfonium salts, triphenylalkyl borate, iron-allene complex, bisimidazoles, polyhalogen compounds, phenylisoxazolone, benzoin ethyl ether, benzyldimethyl ketal and mixtures of these.

The film for optical recording, provided by the present invention, may contain any one of photoinitiator aids such as amines, thiols and p-toluenesulfonic acid.

The film for optical recording, provided by the present invention, may further contain a sensitizer such as a dyestuff for causing the polymerization effectively. When visible light is used as the actinic radiation, the dyestuff is selected from those having absorption in a region of visible light. Specific examples of the dyestuff include Methylene Blue, Acridine Orange, thioflavin, ketocoumarin, Erythrosine C, Eosine Y, merocyanine, phthalocyanine and porphyrin. These dyestuffs may be used alone or in combination.

The film for optical recording, provided by the present invention, may further contain an improver (plasticizer) for improving the mobility of the photopolymerizable compound (A). The improver includes triethylene glycol dicaprylate, triethylene glycol diacetate, triethylene glycol dipropionate, glycerin tributylate, tetraethylene glycol diheptanoate, diethyl adipate, diethyl sebacate and tributyl phosphate. The amount of the improver per 100 parts by weight of the photopolymerizable compound (A) is preferably approximately 0.1 to 10 parts by weight.

The film for optical recording, provided by the present invention, preferably contains 30 to 1,000 parts by weight of the photopolymerizable compound (A) and the 0.01 to 30 parts by weight of the photoinitiator (B) per 100 parts by weight of the gel.

The above film for optical recording can be obtained by applying a composition containing the photopolymerizable compound (A), the photoinitiator (B), a metal compound (C) which is crosslinkable by hydrolysis when in contact with water and the subsequent polycondensation, a good solvent (D) for the above metal compound, water (E) and a catalyst (F) for the hydrolysis of the above metal compound to a substrate, and drying the coating.

The above metal compound (C) which is crosslinkable by hydrolysis when in contact with water and the subsequent polycondensation includes alkoxide, metal salts such as carboxylate, halide and nitrate, and metal complex such as acetylacetonate of silicon, titanium, zirconium or aluminum. Of these metal compounds, preferred are metal alkoxides having an alkoxy group having 1 to 4 carbon atoms such as methoxy, ethoxy, n-propoxy, iso-propoxy, n-butoxy, sec-butoxy, iso-butoxy and tert-butoxy.

Specific examples of the metal alkoxide preferably include tetraethoxysilane, tetramethoxysilane, tetrabutoxysilane, titanium tetraisopropoxide, titanium tetrabutoxide, zirconium tetramethoxide, zirconium tetrabutoxide, aluminum triethoxide and aluminum triethoxide. These metal alkoxides may be used alone or in combination.

A silicon compound having a group which reacts with the hydrolyzate from the metal compound (C) to allow a straight molecular chain to bond to the gel may be used in combination with the metal compound (C). The silicon compound includes silanol-terminated polydialkylsiloxane, epoxysilane and aminosilane. The silicon compound bonds to the gel formed from the metal compound (C) to impart the gel with flexibility. The amount of the silicon compound based on the metal compound (C) is preferably 50% by weight or less, more preferably 30% by weight or less.

The above metal compound (C) undergoes hydrolysis when in contact with water in a solution and undergoes polycondensation and crosslinking to. form a gel. The good solvent (D) for dissolving the metal compound (C) includes alcohols having 1 to 4 carbon atoms such as methanol, ethanol, propanol and butanol.

The catalyst (F) for the hydrolysis of the metal compound (C) includes a solution of acid such as hydrochloric acid, sulfuric acid, nitric acid or acetic acid and a solution of a base such as sodium hydroxide, potassium hydroxide or ammonia. The concentration of the acid or base is preferably 0.001 to 20 N.

In the above composition, provided by the present invention, the amounts (% by weight) of the components (A) to (F), when the total amount of the components is 100% by weight, are preferably as follows.

| | |
|---|---|
| Photopolymerizable compound (A) | 10–80 |
| Photoinitiator (B) | 0.05–30 |
| Metal compound (C) | 5–90 |
| Solvent (D) | 5–90 |
| Water (E) | 0.01–30 |
| Catalyst (F) | 0.05–30 |

The above composition may contain the foregoing photosensitizer and the foregoing improver for improving the mobility of the photopolymerizable compound (A) as required. The amount of each of the photosensitizer and the improver based on the total amount of the components (A) to (F) is 0.01 to 10% by weight. Further, the above composition may contain a leveling agent for obtaining a coating having a smooth surface.

When the photopolymerizable compound (A) is a solid or highly viscous at room temperature, a solvent may be used for homogeneously dissolving the photopolymerizable compound (A) in a solution of the composition. Further, a solvent may be used for dissolving the photoinitiator and the photosensitizer, as required. The solvent is properly selected from methanol, ethanol, isopropanol, toluene, dioxane, chloroform, dichloromethane, methylene chloride, tetrahydrofuran and the like. These solvents can also work as the good solvent (D) for the metal compound. For example, isopropanol is a good solvent for both 2-hydroxy-3-phenoxyhexyl acrylate (solid) and tetraethoxysilane.

The film for optical recording is obtained by coating the above composition in a solution form on a smooth surface of a substrate such as a glass plate or a silicon substrate, and drying the coating.

As the method for the above coating, there can be employable a variety of methods such as a spin coating method, a dip coating method, a bar coating method, a flow coating (curtain coating) method and a method using a doctor blade or an applicator.

The coating is dried at room temperature or under heat at a temperature between 20 and 60° C., optionally under reduced pressure, for 1 minute to several days, whereby volatiles such as the solvent, water, catalyst, etc., are evaporated from the coating. Further, the metal compound (C) undergoes hydrolysis and the subsequent polycondensation to be crosslinked, whereby a gel having a network structure of the inorganic substance is formed, and at the same time, the network structure contains the photopolymerizable compound (A), the photoinitiator (B) and optionally the photosensitizer, etc.

As described above, the solid-like film for optical recording is formed on the smooth surface of the substrate. In the above drying procedure, the volatiles are not completely removed. However, if the content of the residual volatiles is up to about 30% by weight, a substantially solid-like film can be obtained and can be used as the film for optical recording. When the residual solvent is the good solvent for the photopolymerizable compound (A), it works as an improver for the photopolymerizable compound (A) in mobility, and advantageously functions in the polymerization which follows the exposure.

The thickness of the film for optical recording is generally 0.01 to 100 $\mu$m, preferably 1 to 30 $\mu$m. It is preferred to cover the surface of the above film with a transparent resin film or glass sheet. When the surface of the film is so-covered, the polymerization proceeds smoothly after the irradiation with actinic radiation, since the activity of oxygen inhibiting the polymerization is prevented.

The film for optical recording is exposed to actinic radiation to give an optical recording film. The term "radiation" is used in a broad sense including ultraviolet light, visible light, infrared light, electron beam, ion beam, and the like, and the term "actinic radiation" refers to radiation capable of causing a polymerization reaction of the photopolymerizable compound (A).

A hologram is formed from the film for optical recording film by a known method in which the film for optical recording is exposed to interference fringes caused by a coherent radiation. A laser is generally used as a coherent-light source. The exposure can be carried out by a method using a known holographic exposure optical system, which method is generally called a two beam interference exposure method. Laser light from a laser oscillator is separated to two collimated beams or diffused beams by means of a beam splitter, a beam expander or a collimator lens. One beam as reference light is projected on the film for optical recording, and the other beam is projected, for example, on an object when an image of the object is recorded, and light reflected from the object is projected on the film as an object light. The reference light and the object light form interference fringes, and the interference fringes are recorded in the film by refractive index modulation to give an optical recording film (hologram).

When the above two beams are projected in one (same) direction from one side, a transmission type hologram is obtained. When the two beams are projected in opposite directions from two sides, a reflection type hologram is obtained. Depending upon the intensity of radiation and an area on which an optical data is recorded, the time for irradiation with coherent radiation for holographic exposure varies and is generally 0.1 second to 30 minutes, and the exposure is carried out up to a total exposure dose of 0.1 to 1,000 mJ/cm$^2$.

The process of refractive index modulation by exposure to interference fringes is as follows. In an unexposed film for optical recording, first, the photopolymerizable compound (A) is homogeneously contained in the network of the inorganic substance uniformly formed in the entirety of the film. When the film is exposed to interference fringes, the polymerization is selectively initiated according to a light intensity distribution within the film. That is, the polymerization starts at a portion where the light intensity is high, and photopolymerizable compound (A) is accordingly consumed. Therefore, photopolymerizable compound (A) is supplied from a portion where the light intensity is low to a portion where the light intensity is high, and the polymerization is further promoted. During the polymerization, part of the network of the inorganic substance initially present in a high light intensity portion is pushed away into an adjacent low light intensity portion by a polymer whose volume has grown due to photopolymerizable compound (A) supplied from a low light intensity portion. In this case, the movement of the photopolymerizable compound (A) is facilitated in the presence of a mobility improver.

As a result, in an optical recording film obtained by the above process, a region where the light intensity has been high, a polymer from photopolymerizable compound (A) is densely present and the network of the inorganic substance is coarsely present and a region where the light intensity has been low, a polymer from photopolymerizable monomer (A) is coarsely present and the network of the inorganic substance is densely present are formed, whereby regions having different compositions in accordance with light intensity, i.e., regions whose refractive indices are different are formed.

When the difference between the refractive index of the polymer and the refractive index of the inorganic substance forming the network is large, the difference in refractive indices between the above two regions is large, and a hologram having high diffraction efficiency is obtained.

For obtaining a film in which a specific pattern, e.g., a resist pattern is recorded, a mask of a predetermined pattern formed from a substance non-transparent to radiation is placed on a film for optical recording, and the film is exposed to radiation, e.g., from a high-pressure mercury lamp through the mask. In this case, too, the time for the exposure to actinic radiation is generally 0.1 second to 30 minutes, and the total exposure dose is 0.1 to 1,000 mJ/cm$^2$.

Although the first optical recording film of the present invention can be obtained by only exposing the film for optical recording to actinic radiation as described above, it is preferred that the so-obtained optical recording film is further subjected to a step of completing the polymerization of unpolymerized photopolymerizable compound (A) and inactivating the photoinitiator and the photosensitizer.

The above step can be carried out by uniformly irradiating the entire surface of the film, which has been exposed to actinic radiation, with radiation containing wavelength at which the photopolymerizable compound (A) can be photopolymerized. Under this irradiation the polymerization of unpolymerized photopolymerizable compound (A) is promoted, and as a result, the difference in refractive index increases. In a reflection type hologram in particular, therefore, the diffraction efficiency thereof increases. Further, the photoinitiator and the photosensitizer can be inactivated by the irradiation, whereby the optical recording film is improved in durability such as heat resistance and humidity resistance. The above irradiation is generally carried out up to a total irradiation dose of 10 to 10,000 mJ/cm$^2$.

The film which has been exposed to actinic radiation may be subjected to heat treatment at 60° C. or higher in place of, or after, the above uniform irradiation with radiation. Under the heat treatment, the polymerization of unpolymerized photopolymerizable compound (A) in the film is completed, and as a result, the difference in refractive index increases, whereby the diffraction efficiency increases. Further, the solvent is removed by gasification under the heat treatment. Therefore, the diffraction efficiency is improved, and the optical recording film is also improved in heat resistance and humidity resistance. The above heat treatment is generally carried out between 60 and 200° C. for 1 minute to 4 hours.

The first optical recording film produced by the above method can be a surface phase type hologram or a volume phase type hologram. When this optical recording film is a volume phase type hologram, the hologram is excellent in diffraction efficiency, resolution and transmittance and therefore can be used as optical devices such as display hologram, a grating, an optical division device and an optical coupling device.

The second optical recording film of the present invention consists essentially of a porous gel having a network structure of an inorganic substance, and it is an optical recording film in which a network portion having a high porosity and a network portion having a low porosity are present in the porous gel, those different porosities being induced by an optical recording. The presence of network portions having different porosities in the porous gel corresponds to a presence of portions having different refractive indices in the porous gel.

When the above second optical recording film is a surface phase type hologram or a volume phase type hologram, the difference in porosity is formed according to the light intensity distribution of interference fringes of coherent light. A portion exposed to light having high intensity forms a network portion having a high porosity, and a portion exposed to light having low intensity forms a network portion having a low porosity. The network portion having a high porosity has a low refractive index, and the network portion having a low porosity has a high refractive index. Thus, the second optical recording film is modulated in refractive index.

The third optical recording film of the present invention consists essentially of a porous gel having a network structure of an inorganic substance or a gel obtained by densification of the porous gel, and it is an optical recording film in which an concavo-convex form is present on the surface of the gel.

When the above optical recording film is a surface phase hologram or a volume phase hologram, a concavo-convex form is formed on the gel surface according to the light intensity of interference fringes of coherent light. A portion exposed to light having high intensity forms a concave portion and a portion exposed to light having low intensity forms a convex portion. Due to this concavo-convex form, the phase is modulated.

The second and third optical recording films can be obtained by removing organic components from the first optical recording film. In the first optical recording film of the present invention, the refractive index of the inorganic substance and the refractive index of the polymer preferably differ from each other, while the difference in refractive index is not important for obtaining the second and third optical recording films of the present invention.

The above organic components include not only the polymer from the photopolymerizable compound (A) but also residual components such as unpolymerized photopolymerizable compound (A), the photoinitiator, the dyestuff and solvents. The organic components can be removed, for example, by a method in which the film is heated up to 200° C. or higher. In this heat treatment, the organic components in the optical recording film are removed from the film by oxidation and decomposition, and portions from which the organic components have been removed remain as pores, in which gases such as air are present. The temperature for the above heat treatment depends on the organic compounds to be removed such as the photopolymerizable compound (A) and a solvent. For increasing the denseness and mechanical strength of the optical recording film, it is preferred to heat the film up to high temperatures.

Further, the organic components may be also removed from the first optical recording film by another method in which the organic components are oxidized and decomposed by means of ozone generated by irradiation with ultraviolet light having a wavelength of about 184 nm or by a method in which the organic components are eluted in a solvent. These methods may be employed in combination.

In the above step of removing the organic components, the optical recording film is rendered porous, and the film shrinks in the thickness direction so that it has a thickness of approximately ½ to 1/20. This optical recording film would also shrink in the in-plane direction. Since, however, the film is held on the substrate, actually, it hardly shrinks in the in-plane direction. In this case, changes of two types occur.

The change of the first type is that the organic components are removed from a region rich with an organic polymer thereby to increase the porosity of the region. In contrast, a region rich with inorganic network has a lower porosity than the region which has been rich with an organic polymer. And, the portion having a lower porosity has a high apparent refractive index than the portion having a high porosity. That is, in this case, the light intensity distribution is recorded as a porosity distribution, whereby the second optical recording film of the present invention is obtained.

The change of the second type is that the porous film is further densified by further heating the porous film after the change of the first type has occurred, whereby a region which has a high porosity and has been rich with an organic polymer shrinks to a greater degree than a region rich with an inorganic region. As a result of this change, there is obtained the third optical recording film of the present invention on the surface of which a concavo-convex form is formed. A portion exposed to light having high intensity forms a concave portion, and a portion exposed to light having low intensity forms a convex portion.

Differing depending upon the composition and thickness of the first optical recording film, the intensity distribution of light to which the film is exposed and heating temperature, the height of the above concavo-convex form is generally 0.001 to 10 μm, preferably 0.1 to 5 μm.

The heating temperature and time required for forming the second or third optical recording film differ depending upon kind and amount of the inorganic substance and organic components. These conditions can be experimentally determined beforehand. In general, the heating temperature is between 200 and 1,200° C., and the heating time is 1 minute to 5 hours.

When the heating temperature is extremely high, the porosity is reduced to zero in both higher porosity regions and lower porosity regions, and a concavo-convex surface alone is formed. Further, it is possible to form both a concavo-convex surface and a pore distribution. When both the concavo-convex surface and pore distribution are formed, these work additively to increase diffraction efficiency.

The second optical recording film can be any one of a transmission and reflection type hologram as well, while it is suitable as a transmission type hologram. The third optical recording film is used as a transmission type hologram.

The above second and third optical recording films are not only excellent in diffraction efficiency, resolution and transmittance but also excellent in heat resistance, environmental resistance and light resistance when used as surface phase type holograms in particular. Therefore, they can be used as optical devices such as a grating, an optical division device and an optical coupling device.

The present invention will be explained hereinafter by reference to Examples. However, the present invention shall not be limited thereto.

In the following Examples 1 to 5 and 7, transmission and reflection type holograms (gratings) were produced by means of holographic exposure optical systems shown in FIGS. 1 and 2 for easily determining the performances of optical recording films.

FIG. 1 shows an optical system for recording a transmission type hologram (grating), in which numeral 1 indicates an argon ion laser having a total output of 4 W and being to emit light having a wavelength of 514.5 nm, numeral 2 indicates a shutter, numeral 3 indicates a spatial filter, numeral 4 indicates a collimator lens, numeral 5 indicates a beam splitter, numerals 6 and 6' indicate mirrors, and numeral 7 indicates a material for recording a hologram. In this case, the spatial frequency (fringe spacing) of interference fringes to be formed changes depending upon an incident angle (θ) of beam to the material 7.

Figure 2:
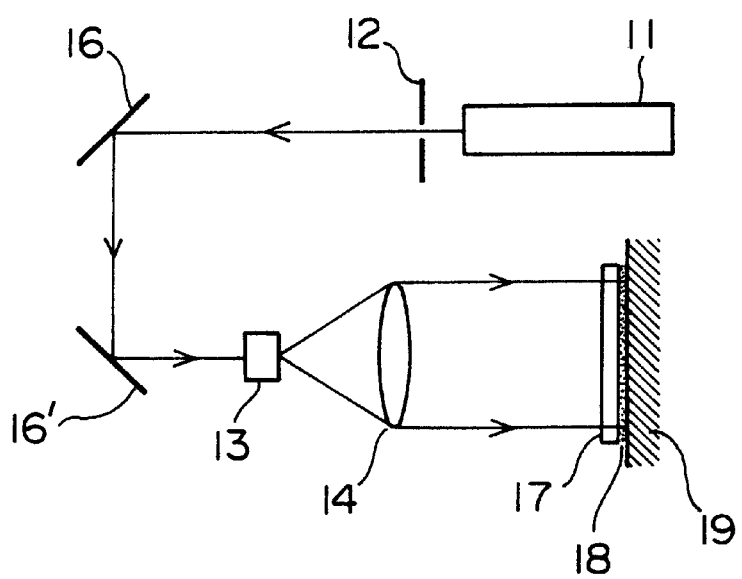
FIG. 2 is a schematic view showing an optical system used for recording a reflection type hologram (diffraction grating) in a film for optical recording, provided by the present invention, in Examples.

FIG. 2 shows an optical system for recording a reflection type hologram (grating), in which numeral 11 indicates an argon ion laser which is the same as that shown in FIG. 1, numeral 12 indicates a shutter, numeral 13 indicates a spatial filter, numeral 14 indicates a collimator lens, and numerals 16 and 16' indicate mirrors. A mirror 19 is placed on the back side of a material 17 for recording a hologram, and interference fringes formed by light from the collimator lens 14 and light reflected from the mirror 19 are recorded. In this case, a liquid 18 (xylene) for matching the refractive index is used between a substrate glass and the mirror 19.

The abbreviations used in Examples stand for the following compounds.

TEOS: Tetraethoxysilane

PDMS: Silanol-terminated polydimethylsiloxane (molecular weight 1,700)

THF: Tetrahydrofuran i-PA: Isopropyl alcohol

Ti(Oi-Pr)$_4$: Titanium tetraisopropoxide

HPPA: 2-Hydroxy-3-phenoxypropyl acrylate

HPA: 2-Hydroxypropyl acrylate

TMPTA: Trimethylolpropane triacrylate

TMPTA-EO6: Adduct of TMPTA with 6 ethylene oxide units

BTTB: 3,3',4,4'-Tetra-(tert-butylperoxycarbonyl) benzophenone (purity 50%, supplied by Nippon Oil & Fats Co., Ltd)

KCD: 3,3'-Carbonylbis(7-diethylaminocoumarin) (supplied by Nippon Kankoh-shikiso Kenkusho Co., Ltd)

EBPA: Ethoxylate bisphenol A diacrylate

EXAMPLE 1

A solution 1 having the following composition and a solution 2 having the following composition were individually prepared. The solution 2 containing a hydrolysis catalyst was added dropwise to the solution 1 with stirring to prepare a homogeneous solution. Then, the so-prepared solution was refluxed at 80° C. for 30 minutes to obtain a homogeneous metal compound solution.

| <Solution 1> | |
| --- | --- |
| TEOS: | 45 g |
| PDMS: | 5 g |
| THF: | 10 cc |
| i-PA: | 15 cc |
| <Solution 2> | |
| i-PA | 20 cc |
| $H_2O$ | 7.8 cc |
| HCl (concentration 12N) | 3.6 cc |

Then, under a red safety lamp on, a photopolymerizable monomer composition (solution 3) having the following composition (including a photoinitiator and a dyestuff) was added to and mixed with, while stirring, the above-obtained metal compound solution in such an amount that the proportion of the solution 3 based on the metal compound solution was 20, 25 or 33% by weight to give three compositions (homogeneous solutions) for recording a hologram.

Incidentally, the solution 3 had been prepared by dissolving BTTB and KCD in a mixture of methylene chloride with methanol, and then adding a photopolymerizable monomer.

| <Solution 3> | |
| --- | --- |
| TMPTA-E06 | 4.75 g |
| TMPTA | 0.25 g |
| BTTB | 1.00 g |
| KCD | 0.05 g |
| Methylene chloride/methanol (95/5, weight ratio) | 2.00 g |

Under a safety lamp, the above three compositions were independently coated on 300×150×2 mm glass substrates with an applicator, and then volatiles such as i-PA, THF, etc. were evaporated by allowing the glass substrates to stand for about 10 hours to give three photosensitive layers (films for optical recording) having a thickness of about 10 $\mu$m. Then, a 100 $\mu$m thick cover film of polyethylene terephthalate was attached onto each photosensitive layer, and the resultant sets were respectively cut to a size of 60×60 mm to give three photosensitive materials each of which was composed of a laminate of glass substrate-photosensitive layer-polyethylene terephthalate film.

Then, in the optical system shown in FIG. 1, 514.5 nm light oscillated from the argon ion laser was split into two collimated beams through the collimator lens 4 and the beam splitter 5 and projected on each of the above three photosensitive materials (laminate of glass substrate-photosensitive layer-polyethylene terephthalate film) at an angle of $\theta$ to expose each photosensitive material. The values of the angle $\theta$ were respectively 5°, 14° and 42°.

After the above interference exposure, the total surface of each photosensitive material was irradiated with a 30 W fluorescent lamp at a distance of 3 cm for about 20 minutes, and heat-treated at 100° C. for 2 hours to complete the polymerization and fix it.

In the above procedures, a transmission type hologram (grating) was recorded in each of the three photosensitive layers by means of interference fringes having a spatial frequency of 170, 470 or 1,400 line pairs/mm. In all the cases, the hologram was excellently recorded. Above all, in the photosensitive material having the photosensitive layer prepared by adding 25% by weight of the monomer composition (solution 3) to the metal compound solution, particularly bright diffracted light was observed. All the photosensitive materials showed high exposure sensitivity and the exposure energy was 30–50 mJ/cm².

When laser beam was projected on these transmission type holograms, diffracted light was observed in all the holograms as theoretically expected. In particular, in the holograms having a spatial frequency of 1,400 line pairs/mm to clearly show Bragg diffraction, bright first order diffracted light was observed.

The photosensitive material prepared by adding 33% by weight of the monomer composition to the metal compound solution had a diffraction efficiency of about 35%.

The gel (silicon oxide) constituting the holograms had a refractive index of 1.46, and the copolymer of photopolymerizable monomers had a refractive index of 1.51.

EXAMPLE 2

A photopolymerizable monomer composition having the following composition including a photoinitiator and a deystuff (solution 4) was added to the same metal compound solution as that used in Example 1 in such an amount that the proportion of the photopolymerizable monomer composition based on the metal compound solution was 20, 25 or 33% by weight. The resultant mixtures were respectively stirred to give three homogeneous solutions of compositions for optical recording.

| <Solution 4> | |
| --- | --- |
| HPPA | 4.75 g |
| TMPTA | 0.25 g |
| BTTB | 1.00 g |
| KCD | 0.05 g |
| Methylene chloride/methanol (95/5, weight ratio) | 2.00 g |

Photosensitive materials having about 8 $\mu$m thick photosensitive layers were prepared from the above three compositions for optical recording in the same manner as in Example 1, a transmission type hologram (grating) having a spatial frequency of 170, 470 or 1,400 line pairs/mm was recorded in each of the photosensitive materials. In all the cases, the transmission type hologram was as excellently recorded as in Example 1.

When laser beam was projected on these transmission type holograms, diffracted light was observed in all the holograms as theoretically expected. In particular, in the hologram having a spatial frequency of 1,400 line pairs/mm to clearly show Bragg diffraction was recorded, remarkably bright first order diffracted light was observed.

The gel (silicon oxide) constituting the holograms had a refractive index of 1.46, and the copolymer of photopolymerizable monomers had a refractive index of 1.55.

The brightness of diffracted light from the holograms was higher than that of diffracted light from the holograms in Example 1. That is because the used photopolymerizable monomer had a higher refractive index so that larger refractive index modulation was obtained. When the transmission type holograms obtained in this Example were heat-treated at 300° C. for 2 hours, the gratings retained the function of the gratings and showed high heat resistance. For comparison, a hologram composed of a wholly organic composition was heat-treated in the same manner, and it was found that the function of the grating was completely lost.

EXAMPLE 3

A reflection type hologram was recorded in the same photosensitive material as the one obtained in Example 2, which was formed from the homogeneous solution prepared by adding 33% by weight of the photopolymerizable monomer composition (solution 4) to the same metal compound solution as that of Example 1. FIG. 2 shows the exposure method employed in this Example. That is, a mirror 9 was placed toward the reverse side of the photosensitive material (laminate of glass substrate/photosensitive layer/polyethylene terephthalate) through a refractive index matching liquid (xylene) 18, and interference fringes formed by parallel beams obtained through a collimator lens 14 and light reflected from the mirror were recorded.

After the above holographic exposure, the entire surface exposure and heat treatment were carried out. The diffraction efficiency was improved step after step, and after the heat treatment at 200° C., a maximum diffraction efficiency value of 43% was obtained. Table 1 shows the results. The exposure sensitivity was as high as 30–50 mJ/cm$^2$.

TABLE 1

| Step | Diffraction efficiency (%) |
|---|---|
| After homographic exposure | 10.1 |
| After exposure of entire surface | 21.1 |
| After heat treatment | |
| 100° C. - 2 hr. | 25.9 |
| 200° C. - 2 hr. | 43.0 |

EXAMPLE 4

A solution 5 having the following composition and a solution 6 having the following composition were individually prepared, and the solution 6 containing a hydrolysis catalyst was added dropwise to the solution 5 with stirring to prepare a metal compound solution.

| <Solution 5> | |
|---|---|
| Ti(Oi-Pr)$_4$ | 20 g |
| i-PA | 20 cc |
| <Solution 6> | |
| i-PA | 40 cc |
| H$_2$O | 0.5 cc |
| HCl (concentration: 12N) | 2 cc |

50 Parts by weight of the following photopolymerizable monomer composition (solution 7) containing a photoinitiator and a dyestuff was added to 100 parts by weight of the above-prepared metal compound solution to give a composition in a homogeneous solution state for optical recording.

| <Solution 7> | |
|---|---|
| HPA | 3 g |
| BTTB | 0.4 g |
| KCD | 0.01 g |
| Methylene chloride | 1.5 g |
| Methanol | 0.5 g |

The solution 7 was prepared as follows. BTTB and the KCD were dissolved in a mixture of methylene chloride with methanol to prepare a solution, and the photopolymerizable monomer was added to the solution to obtain a homogeneous solution 7.

A photosensitive material was prepared using the above-prepared solution of the composition for optical recording, and exposed, in the same manner as in Example 1, to produce a transmission type hologram (grating). When the spatial frequency was 1,400 line pairs/mm, the so-produced hologram showed a diffraction efficiency of about 35% after the exposure of the entire surface and a diffraction efficiency of about 40% after further heat treatment at 100° C. for 1 hour.

The gel (titanium oxide) constituting the hologram had a refractive index of 2.4, and the homopolymer of HPA had a refractive index of 1.50.

EXAMPLE 5

A solution 8 having the following composition and a solution 9 having the following composition were individually prepared, and the solution 9 containing a hydrolysis catalyst was added dropwise to the solution 8 with stirring to prepare a homogeneous solution. Then, this solution was refluxed at 80° C. for 40 minutes to obtain a metal compound solution.

| <Solution 8> | |
|---|---|
| TEOS | 27 g |
| PDMS | 3 g |
| THF | 5 cc |
| i-PA | 9 cc |
| <Solution 9> | |
| i-PA | 12 cc |
| H$_2$O | 2 cc |
| HCl (concentration: 12N) | 5 cc |

Under a red safety lamp, a solution 10 having the following composition was mixed with 5.0 g of the above metal compound solution to obtain a composition in a homogeneous solution state for optical recording.

| <Solution 10> | |
|---|---|
| HPPA | 4.75 g |
| EBPA | 0.25 g |
| BTTB | 0.50 g |
| KCD | 0.01 g |
| Methylene chloride/methanol (95/5, weight ratio) | 1.00 g |

The above-obtained composition was coated on a 300× 150×2 mm glass substrate with an applicator under a red safety lamp, and the resultant coating was gelated and dried by allowing the substrate to stand at 30° C. for about 24 hours, to give a crack-free photosensitive layer having a thickness of about 9.5 μm. Then, a cover film of polyethylene terephthalate having a thickness of loo am was attached onto the above photosensitive layer, and the resultant set was cut to a size of 60×60 mm to give a photosensitive material composed of a laminate of glass substrate-photosensitive layer-polyethylene terephthalate film.

Then, in the optical system shown in FIG. 1, 514.5 nm light oscillated from the argon ion laser was projected on each of the three photosensitive materials (laminate of glass substrate-photosensitive layer-polyethylene terephthalate film) at an angle of θ to expose each photosensitive material to interference fringes in the same manner as in Example 1. The values of the angle θ were respectively 5°, 14° and 42°, and the exposure energy was 30 to 50 mJ/cm$^2$.

After the holographic exposures, the entire surface of each photosensitive material was exposed to a 30 W fluorescent lamp positioned at a distance of 3 cm for about 15 minutes to complete the polymerization of unpolymerized monomer and fix it.

Gratings were produced in each of the so-obtained photosensitive materials by means of interference fringes having a spatial frequency of about 170, 480 or 1,400 line pairs/mm.

The polyethylene terephthalate film was peeled off from each grating, and the gratings were heated up to 500° C. in an electric furnace at a temperature elevation rate of 50° C./hour. The gratings were kept at this temperature for 4 hours. Then, the temperature inside the electric furnace was gradually decreased to room temperature in about 10 hours, and the gratings were taken out to give laminates each of which was composed of a 1.2 μm thick SiO$_2$ film where the grating having a spatial frequency of 170, 480 or 1,400 line pairs/mm was recorded and the glass substrate. The cross section of each SiO$_2$ film was observed through an electron microscope at a magnification of 1,000× to 50,000× to show the formation of a surface concavo-convex form based on the intensity of the interference fringes and a slight density distribution of silica particles. That is, the mountain range-like convex portion on the surface had a height of about 1 μm and a width of about 1 μm, and the pitch of the concavo-convex form (i.e., distance between the center of one convex portion and the center of a neighboring convex portion) was about 6 μm, about 2 μm or about 0.7 μm depending upon the above spatial frequency. It was also found that silica particles (diameter approximately 0.01–0.1 μm) were densely present inside convex portions on the film surface and they were coarsely present (there were many pores) in concave portions. The function of the film as a grating was mainly based on the concavo-convex form on the surface.

EXAMPLE 6

A USAF test target (spatial frequency 1–228 line pairs/mm, supplied by Melles Griot) as a masking sheet was placed on the same photosensitive material as that prepared in Example 5, and the photosensitive material was exposed to a 2 kW ultraviolet lamp positioned at a distance of 30 cm from the light source for 5 seconds. The polyethylene terephthalate film was peeled off, and then the photosensitive material was heated up to 500° C. in an electric furnace at a temperature elevation rate of 50° C./hour and kept at 500° C. for 4 hours. The temperature inside the electric furnace was gradually cooled to room temperature in about 10 hours, and the photosensitive material was taken out. The surface of the resultant SiO$_2$ film was observed through an electron microscope to show the formation of a surface concavo-convex form based on the mask pattern.

EXAMPLE 7

The following solutions 11 and 12 were individually prepared, and then the solution 12 containing a hydrolysis catalyst was gradually added dropwise to the solution 11 with stirring to obtain a homogeneous metal compound solution.

| <Solution 11> | |
|---|---|
| Ti(Oi-Pr)$_4$ | 20 g |
| i-PA | 20 cc |
| <Solution 12> | |
| i-PA | 40 cc |
| H$_2$O | 2.0 cc |
| HCl (concentration: 12N) | 0.5 cc |

Then, under a red safety lamp, a solution 13 having the following composition was mixed with 10.0 g of the above metal compound solution to obtain a composition in a homogeneous solution state for optical recording.

| <Solution 13> | |
|---|---|
| HPPA | 4.75 g |
| EBPA | 0.25 g |
| BTTB | 0.50 g |
| KCD | 0.01 g |
| Methylene chloride/methanol (95/5, weight ratio) | 1.00 g |

The above composition was coated in the same manner as in Example 5 to obtain a photosensitive material, and grating was recorded by means of interference fringes having a spatial frequency of 1,400 line pairs/mm.

The so-obtained optical recording film was measured for diffraction efficiency with 632.8 nm beam oscillated from a He-Ne laser. The diffraction efficiency was calculated as a ratio of the intensity of first order diffracted light to the intensity of incident light. Table 2 shows the results. The optical recording film whose entire surface had been exposed to a fluorescent lamp showed a diffraction efficiency of only 2.2%. However, the diffraction efficiency gradually improved as the temperature for heat treatment increased, and the optical recording film heat-treated at 400–500° C. showed a diffraction efficiency of about 50%.

TABLE 2

| Temperature for heat treatment | Diffraction efficiency (%) |
|---|---|
| Before heating (after exposure of entire surface) | 2.2 |
| 100° C. | 2.5 |
| 200° C. | 4.7 |
| 300° C. | 11.8 |
| 400° C. | 50.5 |
| 500° C. | 49.2 |

After the heat treatment at 400° C., the cross section of the optical recording film was observed through an electron microscope to show the formation of a pore distribution and a slight surface concavo-convex form as well.

As describe above, the diffraction efficiency of the grating improves for the following reason. Before heat treatment, the difference in refractive index between a region rich with an organic polymer and a region rich with an inorganic network is small correspondingly to a small difference (about 0.05) between the refractive index (about 1.55) of a polymer (copolymer of HPPA and EBPA) and the refractive index (1.6) of titanium oxide gel, while in the grating after the heat treatment at 400° C., the difference (about 1.35) between the refractive index (about 2.4) of titanium oxide and the refractive index (about 1.0) of air is very large.

What is claimed is:

1. A hologram-producing film which:

(1) comprises:

(i) a gel of a network structure of an inorganic substance selected from the group consisting of silicon dioxide, titanium oxide, zirconium oxide and aluminum oxide;

(ii) a photopolymerizable compound (A) selected from the group consisting of photopolymerizable monomers and photopolymerizable oligomers; and (iii) a photoinitiator (B);

said photopolymerizable compound (A) and said photoinitiator (B) being contained in said network structure of said gel, and a refractive index of a polymer from said photopolymerizable compound (A) being different from that of said inorganic substance, (2) said hologram-producing film which produces a hologram when exposed to interference fringes of a coherent laser light.

2. The hologram-producing film of claim 1 wherein said network structure of said inorganic substance is formed by contacting a metal compound (C), selected from the group consisting of a silicon compound, a zirconium compound, a titanium compound and an aluminum compound, with water, while said metal compound (C) is crosslinkable by:

(1) self-hydrolysis when in contact with water; and (2) polycondensation.

3. The hologram-producing film of claim 1, wherein, per 100 parts by weight of said inorgenic substance, said photopolymerizable compound (A) is contained in an amount of 30 to 600 parts by weight and said photoinitiator (B) is contained in an amount of 0.01 to 30 parts by weight.

4. The hologram-producing film of claim 1, further containing a plasticizer for said photopolymerizable compound (A).

5. A process for the production of a hologram which comprises recording optical data by exposing, to interference fringes of a coherent laser light, a film which comprises:

(1) a gel of a network structure of an inorganic substance selected from the group consisting of silicon dioxide, titanium oxide, zirconium oxide and aluminum oxide;

(2) a photopolymerizable compound (A) selected from the group consisting of photopolymerizable monomers and photopolymerizable oligomers; and (3) a photoinitiator (B);

wherein said photopolymerizable compound (A) and said photoinitiator (B) are contained said gel of said network structure of said inorganic substance, and the refractive index, of a polymer from said photopolymerizable compound (A), is different from the refractive index of said inorganic substance.

6. The process of claim 5 wherein said network structure of said inorganic substance is formed by contacting a metal compound (C), selected from the group consisting of a silicon compound, a zirconium compound, a titanium compound and an aluminum compound, with water, while said metal compound (C) is crosslinkable by:

(1) self-hydrolysis when in contact with water; and (2) polycondensation.

7. The process of claim 5, which further comprises, after said exposure, uniformly irradiating an entire surface of said film with non-interferometric radiation, said non-interferometric radiation including at least one wave length at which said photopolymerizable compound (A) can be photopolymerized to complete the photopolymerization of said photopolymerizable compound (A).

8. The process of claim 7 which further comprises, after said uniform irradiation, subjecting said film to heat treatment.

9. The process of claim 5 which further comprises, after said exposure, subjecting said film to heat treatment.

10. The process of claim 5 in which the difference of refractive indices between the polymer from the photopolymerizable compound (A) and the inorganic substance is at least 0.01.

11. The process of claim 5 wherein said hologram has (1) a first region caused by said coherent laser light of high intensity, where the polymer from said photopolymerizable compound (A) is densely present, and (2) a second region having a different refractive index from that of said first region, caused by said coherent laser light of low density, where said polymer is coarsely present and said gel is densely present.

\* \* \* \* \*